(12) United States Patent
Livingston Viswasam

(10) Patent No.: US 10,752,181 B2
(45) Date of Patent: Aug. 25, 2020

(54) PIVOTING VIDEO ARM MECHANISM AND ASSEMBLY

(71) Applicant: Safran Seats USA LLC, Gainesville, TX (US)

(72) Inventor: Solomon R. Livingston Viswasam, Denton, TX (US)

(73) Assignee: Safran Seats USA LLC, Gainesville, TX (US)

( * ) Notice: Subject to any disclaimer, the term of this patent is extended or adjusted under 35 U.S.C. 154(b) by 21 days.

(21) Appl. No.: 16/320,716

(22) PCT Filed: Jul. 27, 2016

(86) PCT No.: PCT/US2016/044213
§ 371 (c)(1),
(2) Date: Jan. 25, 2019

(87) PCT Pub. No.: WO2018/022033
PCT Pub. Date: Feb. 1, 2018

(65) Prior Publication Data
US 2019/0161023 A1    May 30, 2019

(51) Int. Cl.
*E04G 3/00* (2006.01)
*B60R 11/02* (2006.01)
(Continued)

(52) U.S. Cl.
CPC ...... *B60R 11/0235* (2013.01); *B64D 11/0638* (2014.12); *F16M 11/10* (2013.01);
(Continued)

(58) Field of Classification Search
CPC .............. B60R 11/0235; F16M 11/10; F16M 11/2028; F16M 11/38; F16M 13/02; F16M 11/2021; B64D 11/0638; B64D 11/0015
(Continued)

(56) References Cited

U.S. PATENT DOCUMENTS 1,734,051 A    11/1929  Schuler et al.
6,179,263 B1 *  1/2001  Rosen ................ B64D 11/0015
                                                248/278.1
(Continued)

FOREIGN PATENT DOCUMENTS

DE          1425957     3/1969
WO       1998013643     4/1998

OTHER PUBLICATIONS

International Patent Application No. PCT/US2016/044213, International Search Report and Written Opinion; dated May 10, 2017.

*Primary Examiner* — Todd M Epps
(74) *Attorney, Agent, or Firm* — Kilpatrick Townsend & Stockton LLP

(57) ABSTRACT

Described is a articulating arm assembly for a passenger seat that includes a mounting bracket attached to a passenger seat, a pivot attached to the mounting bracket, an arm body rotatably attached to the pivot such that the arm body is configured to move between a stowed position and a deployed position, and a closeout that includes a flexible portion, a first end attached to a first attachment point internal to the pivot, and a second end attached to a second attachment point internal to the pivot. The flexible portion is configured to change shape depending on a location of the arm body.

21 Claims, 21 Drawing Sheets

(51) Int. Cl.
  *F16M 11/10*  (2006.01)
  *F16M 11/20*  (2006.01)
  *F16M 11/38*  (2006.01)
  *F16M 13/02*  (2006.01)
  *B64D 11/06*  (2006.01)
  *B60R 11/00*  (2006.01)

(52) U.S. Cl.
  CPC ..... *F16M 11/2021* (2013.01); *F16M 11/2028* (2013.01); *F16M 11/38* (2013.01); *F16M 13/02* (2013.01); *B60R 2011/0089* (2013.01); *B64D 11/0647* (2014.12); *F16M 2200/024* (2013.01); *F16M 2200/065* (2013.01)

(58) Field of Classification Search
  USPC .... 248/284.1, 276.1, 286.1, 278.1; 348/837; 297/217.3, 194
  See application file for complete search history.

(56) References Cited

U.S. PATENT DOCUMENTS

| | | |
|---|---|---|
| 6,601,811 B1 | 8/2003 | Van Lieshout |
| 8,523,130 B2 * | 9/2013 | Westerink .......... B64D 11/0015 16/363 |
| 9,989,191 B2 * | 6/2018 | Parker ................. B60R 11/0235 |
| 10,322,805 B2 * | 6/2019 | Westerink ........ H04N 21/41422 |
| 2010/0243839 A1 | 9/2010 | Westerink |
| 2014/0192271 A1 | 7/2014 | Westerink |

* cited by examiner

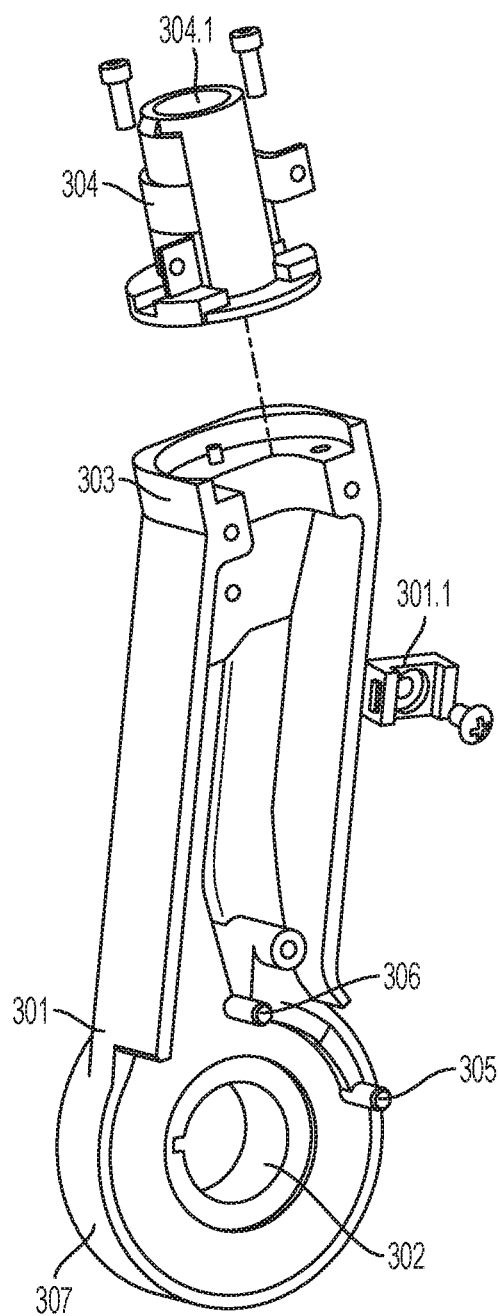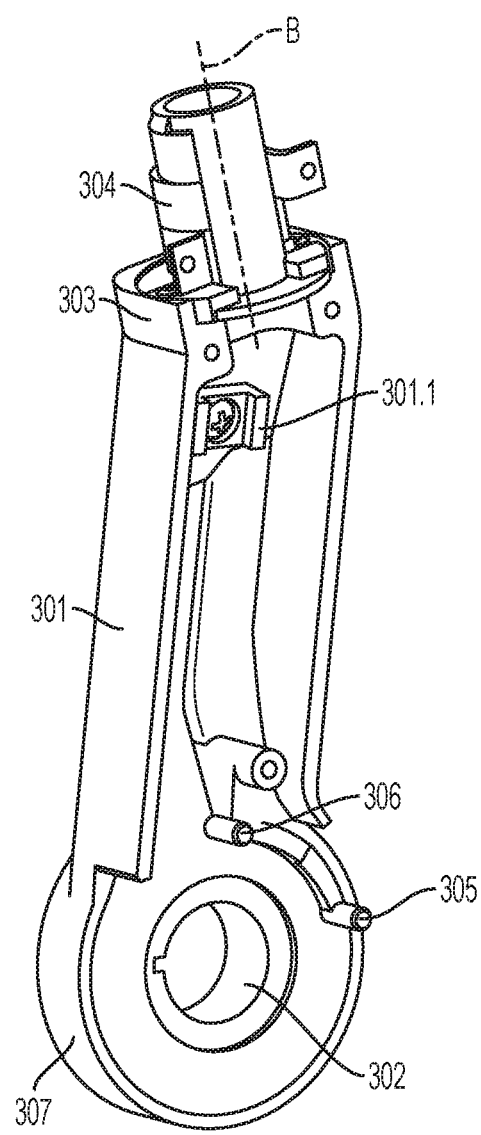
FIG. 6A
FIG. 6B

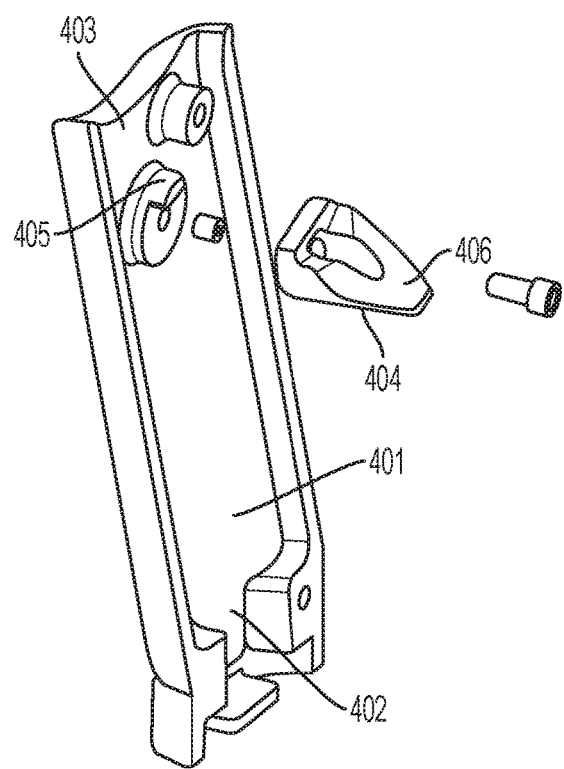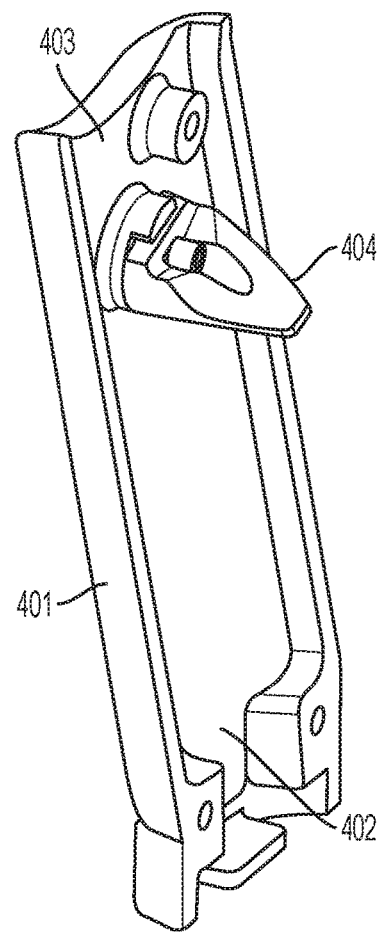
FIG. 7A
FIG. 7B

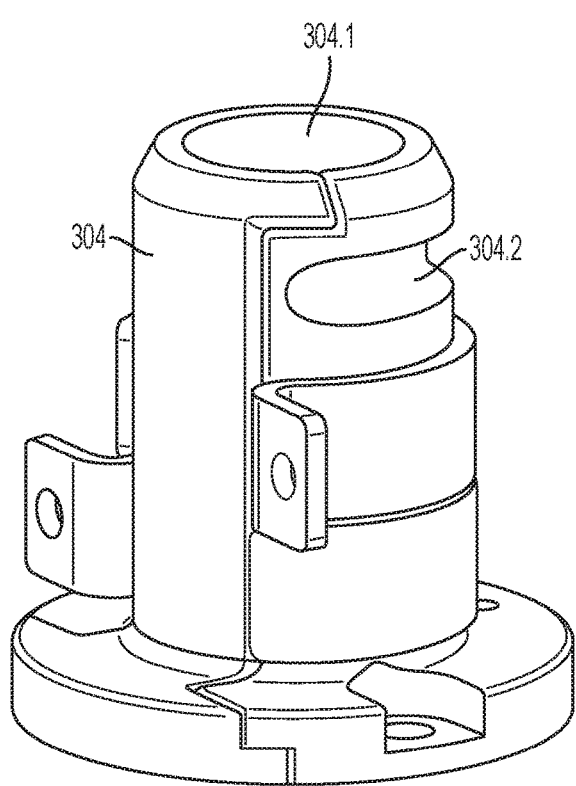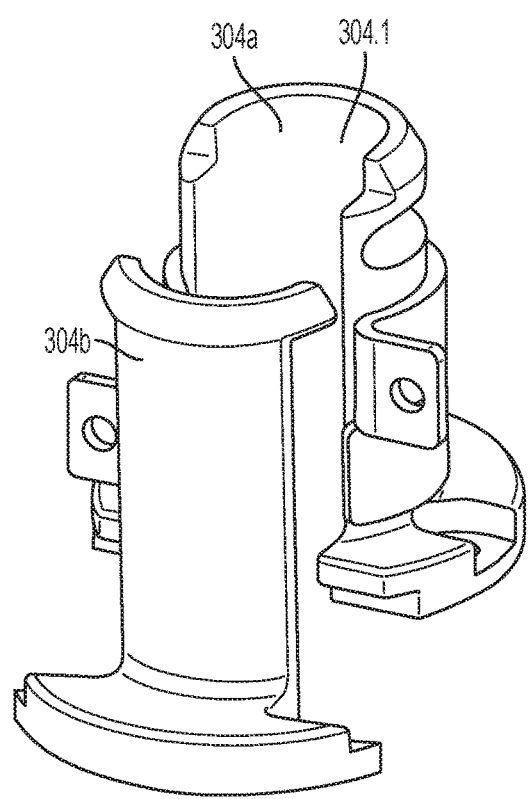
FIG. 8B
FIG. 8C

PIVOTING VIDEO ARM MECHANISM AND ASSEMBLY

FIELD OF THE INVENTION

The field of the invention relates to pivoting arms for electronic components such as video screens for aircraft or the like.

BACKGROUND

In many instances, passenger vehicles, such as aircraft, buses, trains, ships, and automobiles, include passenger seats with a wide assortment of portable electronic and entertainment options to encourage passengers to remain seated as much as possible during transport for safety, crew mobility, and to enable efficient cabin service. Some passenger seats may provide video and/or audio entertainment, including television, video games, internet access, and other on-board entertainment ("OBE") or in-flight entertainment ("IFE") components. Many of these electronic devices are mounted in pivoting arms attached to the passenger seats such that a video screen and/or a receptacle and wired interface for a passenger's personal electronic device ("PED") are attached to the arm of the seat.

The electronic device (OBE, IFE, and/or PED) requires one or more articulating hinges and wires for connecting data and/or power sources to the electronic device. To this point, there have been very few examples of seat arms that sufficiently cover/conceal related wiring in the final assembled condition of the seat. In addition, existing seat assemblies require wires/cables to be fed through portions of the seat/arm assembly during manufacturing and/or repair operations such that one connector must be attached to the wire/cable bundle after the arm is assembled.

In certain situations, it may be desirable to fully enclose all wires/cables within a seat arm and simplify the assembly process for inserting the wires into the seat arm while improving the function of the seat arm.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an articulating arm assembly for a passenger seat comprises: an arm body rotatably attached to a pivot, the arm body configured to move between a stowed position and a deployed position; and a closeout comprising: a flexible portion; a first end attached to a first attachment point internal to the pivot; and a second end attached to a second attachment point internal to the pivot, wherein the flexible portion is configured to change shape depending on a location of the arm body.

In some embodiments, the flexible portion comprises a protrusion disposed between the first end and the second end wherein the protrusion moves based on a position of the arm body. In certain embodiments, when the arm body is in the stowed position, the protrusion is disposed closer to the first end of the closeout, and when the arm body is in the deployed position, the protrusion is disposed closer to the second end of the closeout.

The articulating arm assembly, in certain embodiments, further comprises an arm cover that attaches to a first side of the arm body, the arm cover comprising a first end, a second end, and a receptacle disposed near the first end for attaching to a roller. In some embodiments, the flexible portion is stretched around the roller such that the protrusion corresponds to the position of the roller. In certain embodiments, the roller comprises an at least partially cylindrical outer surface and an angled surface.

In certain embodiments, the pivot moves in a linear direction relative to a mounting bracket when the arm body moves between the stowed position and the deployed position.

The articulating arm assembly, in certain embodiments, further comprises a hinge disposed at a distal end of the arm body, the hinge configured to rotate about a hinge axis perpendicular to a rotation axis of the arm body. In some embodiments, the hinge comprises a central cylindrical cavity extending in a direction approximately parallel to the hinge axis, the central cylindrical cavity configured to receive wiring passing through the arm body. In certain embodiments, the hinge comprises a main portion and a removable secondary portion. The articulating arm assembly, in certain embodiments, further comprises a removable pin, wherein the hinge is limited to a rotation in an arc of approximately 90° when the removable pin is inserted and the hinge is freely rotatable when the removable pin is removed.

According to certain embodiments of the present invention, a passenger seat comprises: an articulating arm assembly comprising: an arm body rotatably attached to a pivot, the arm body configured to move between a stowed position and a deployed position; and a closeout that comprises at least one flexible portion and at least one attachment to an internal portion of the pivot, wherein the at least one flexible portion is configured to change shape depending on a location of the arm body.

In some embodiments, the at least one flexible portion comprises a protrusion disposed between the first end and the second end wherein the protrusion moves based on a position of the arm body.

In certain embodiments, when the arm body is in the stowed position, the protrusion is disposed closer to the first end of the closeout, and when the arm body is in the deployed position, the protrusion is disposed closer to the second end of the closeout.

The passenger seat, in certain embodiments, further comprises an arm cover that attaches to a first side of the arm body, the arm cover comprising a first end, a second end, and a receptacle disposed near the first end for attaching to a roller. In certain embodiments, the at least one flexible portion is stretched around the roller such that the protrusion corresponds to the position of the roller. In some embodiments, the roller comprises an at least partially cylindrical outer surface and an angled surface.

In certain embodiments, the pivot moves in a linear direction relative to a mounting bracket when the arm body moves between the stowed position and the deployed position.

The passenger seat, in certain embodiments, further comprises a hinge disposed at a second end of the arm body, the hinge configured to rotate about a hinge axis perpendicular to a rotation axis of the arm body.

In some embodiments, the hinge comprises a central cylindrical cavity extending in a direction approximately parallel to the hinge axis, the central cylindrical cavity configured to receive wiring passing through the arm body.

The hinge, in certain embodiments, further comprises a central cylindrical cavity extending in a direction approximately parallel to the hinge axis, the central cylindrical cavity configured to receive wiring passing through the arm body.

In certain embodiments, the hinge comprises a main portion and a removable secondary portion.

The passenger seat, in certain embodiments, further comprises a removable pin, wherein the hinge is limited to a rotation in an arc of approximately 90° when the removable pin is inserted and the hinge is freely rotatable when the removable pin is removed.

In some embodiments, the at least one flexible portion comprises two separate flexible portions.

BRIEF DESCRIPTION OF THE DRAWINGS

FIGS. 6A and 6B are detail perspective views of the articulating arm assembly of FIG. 1A.

FIGS. 7A and 7B are detail perspective views of the articulating arm assembly of FIG. 1A.

FIGS. 8A, 8B, and 8C are detail perspective views of the articulating arm assembly of FIG. 1A.

DETAILED DESCRIPTION

Figure 1A:
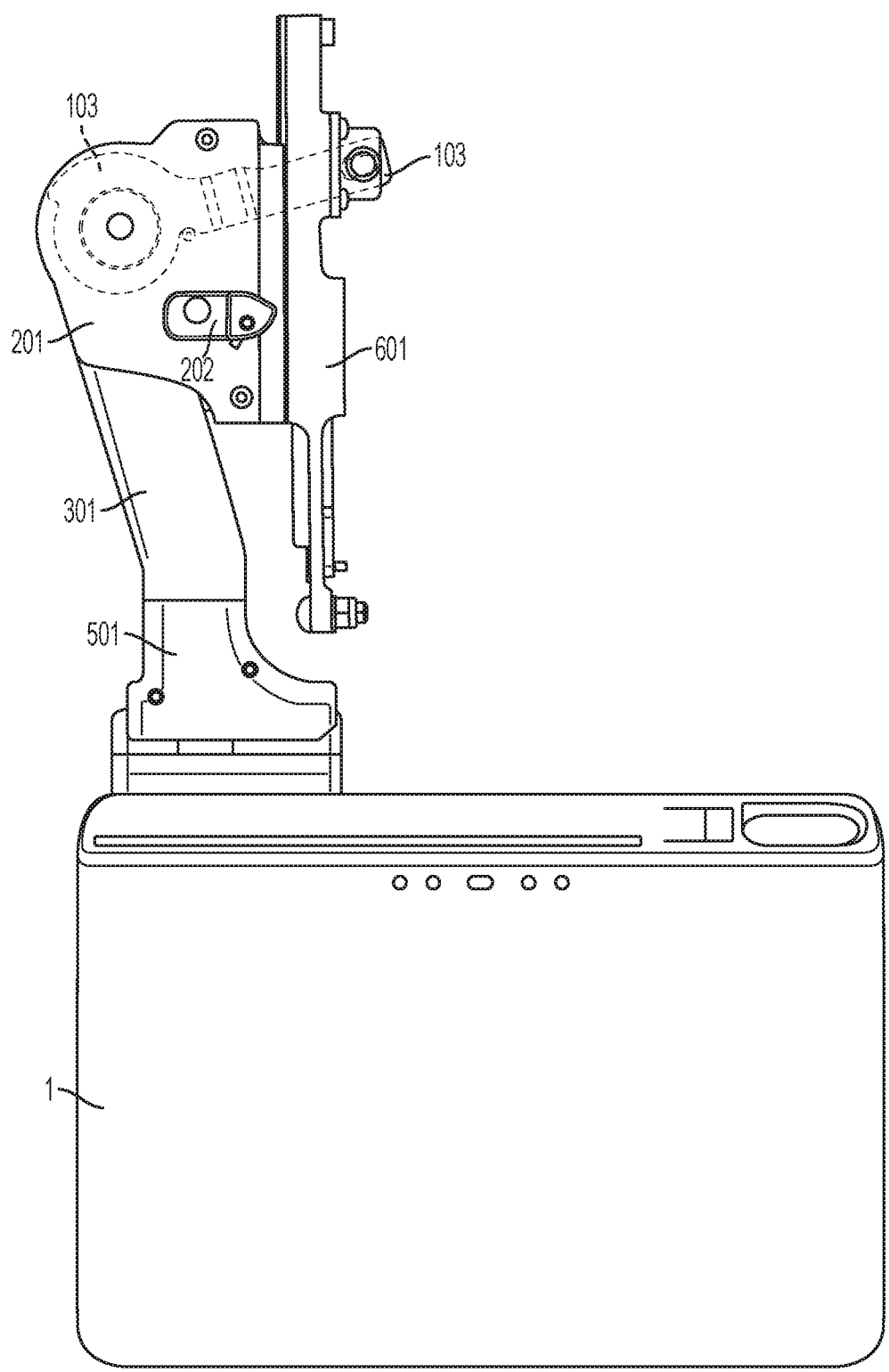
FIG. 1A is a side view of an articulating arm assembly in a stowed configuration according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1A-12B illustrate embodiments of articulating arm assemblies for passenger seats where the articulating arm assemblies are configured to support one or more electronic devices 1. In these embodiments, the articulating arm assembly may include at least a pivot 101, a pivot cover 201, an arm body 301, an arm cover 401, a second pivot 501, and a mounting bracket 601.

Figure 1B:
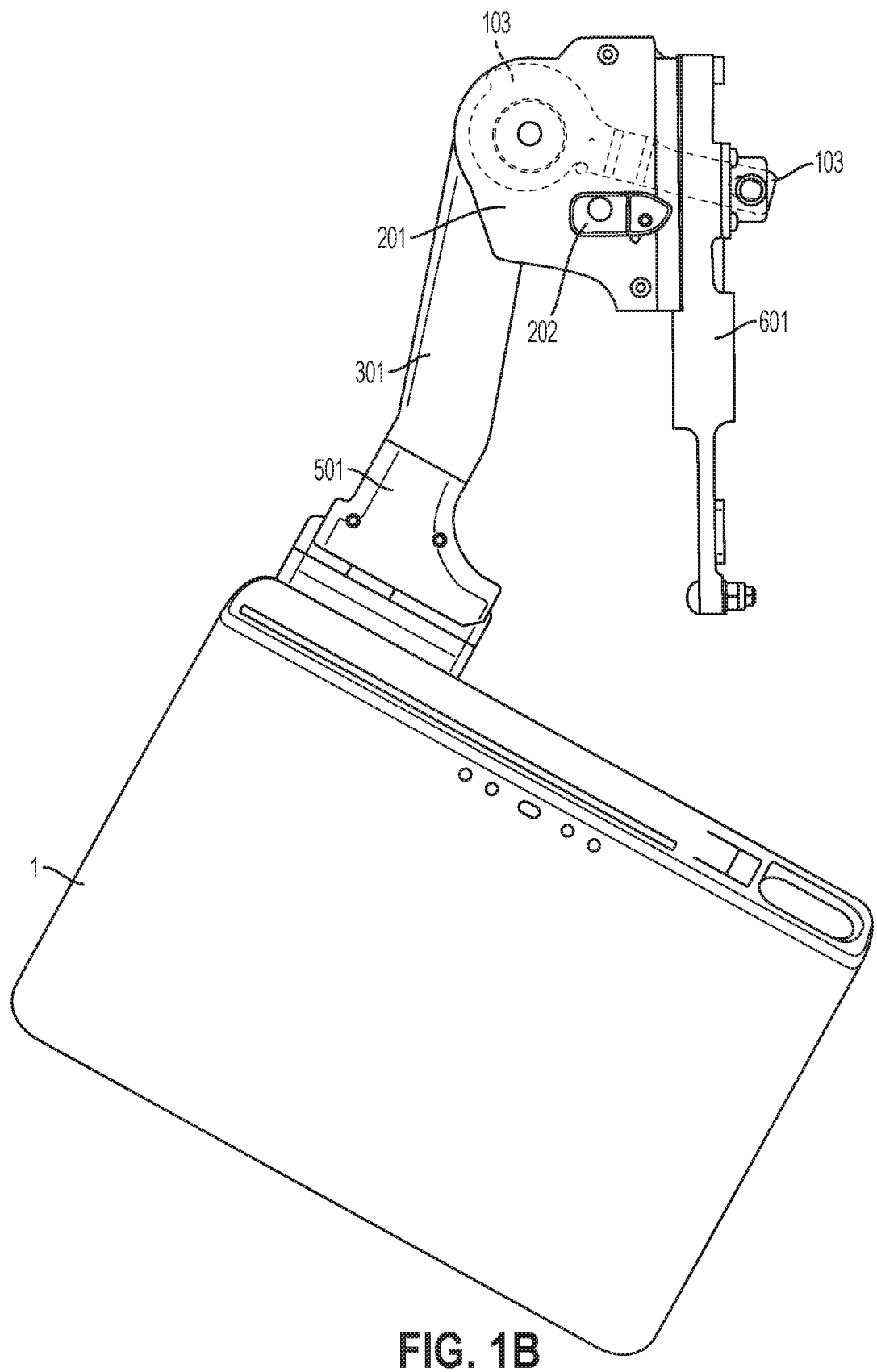
FIG. 1B is a side view of the articulating arm assembly of FIG. 1A with the articulating arm assembly in a released configuration.
Figure 1C:
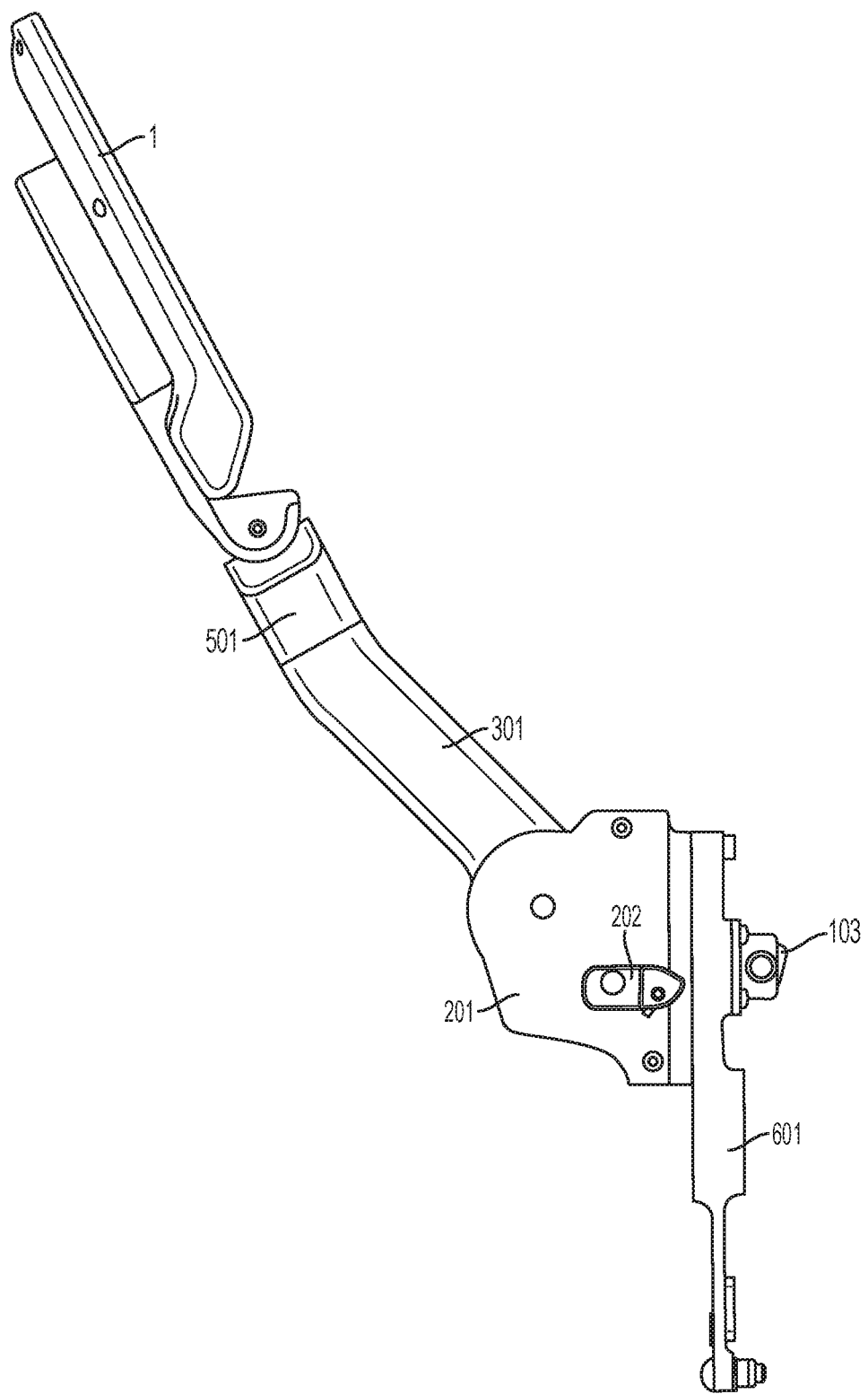
FIG. 1C is a side view of the articulating arm assembly of FIG. 1A with the articulating arm assembly in a deployed configuration.

FIGS. 1A and 1B show the articulating arm assembly in various configurations. FIG. 1A shows the articulating arm assembly in a stowed position (see also FIGS. 2B and 2D). FIG. 1B shows the articulating arm assembly in a released position. FIG. 1C shows the articulating arm assembly in a deployed or viewing position (see also FIGS. 2A and 2C).

Figure 2A:
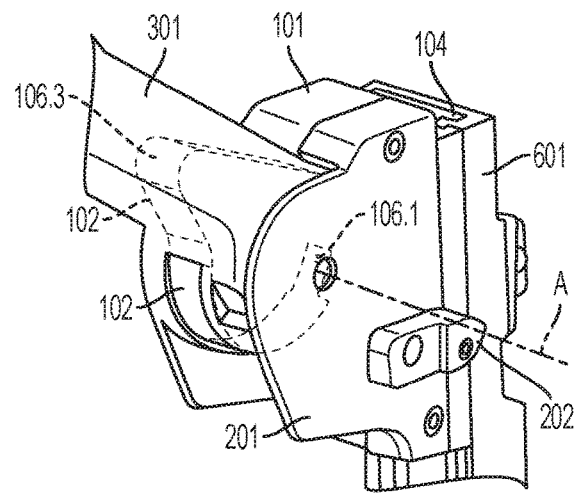
FIG. 2A is a detail perspective view of the articulating arm assembly of FIG. 1A in the deployed configuration.
Figure 2B:
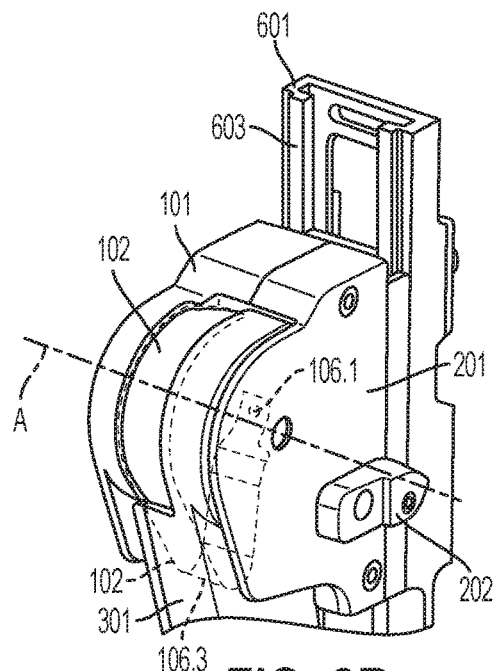
FIG. 2B is a detail perspective view of the articulating arm assembly of FIG. 1A in the stowed configuration.
Figure 3:
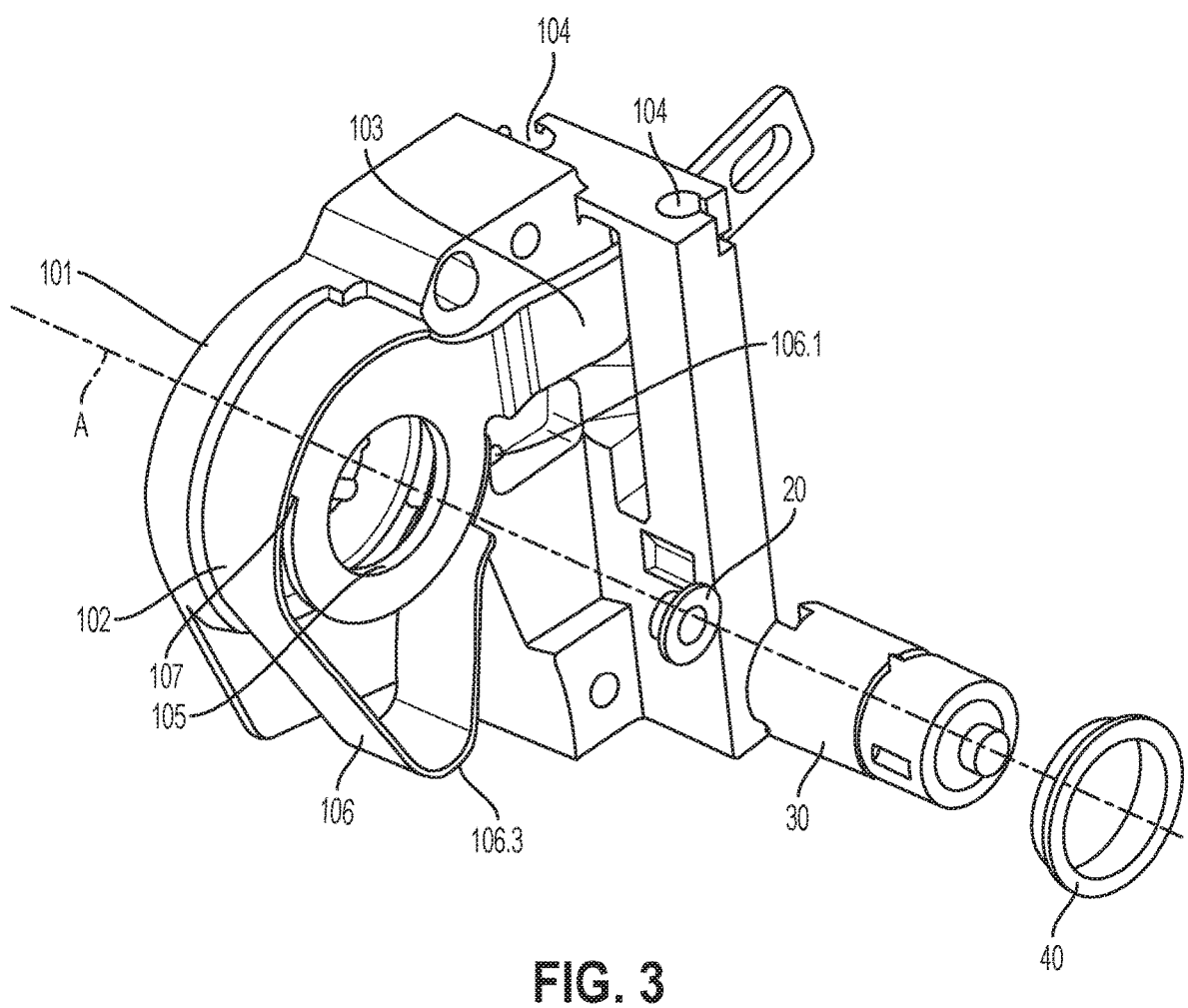
FIG. 3 is a detail perspective view of the articulating arm assembly of FIG. 1A.

As shown in FIGS. 2A, 2B, and 3, the pivot 101 defines a hinge axis A for pivoting the arm. The pivot 101 also includes at least one elongated cavity or receptacle 104 that is configured to interface with a matching protrusion 603 of the mounting bracket 601 (see also FIG. 11C). When the articulating arm assembly moves from the stowed configuration (FIG. 1A) to either the released configuration (FIG. 1B) or the deployed configuration (FIG. 1C), the pivot traverses upward relative to the mounting bracket 601 along the interface of the receptacle 104 and the matching protrusion 603. In some embodiments, the pivot 101 slides upward relative to the mounting bracket 601 due to gas lock system 50 (see FIG. 10A).

Figure 2C:
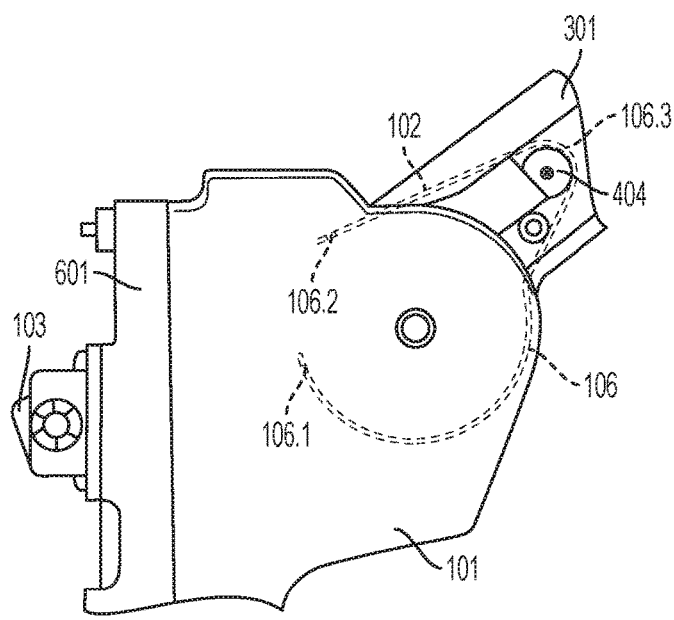
FIG. 2C is a detail side view of the articulating arm assembly of FIG. 1A in the deployed configuration.
Figure 2D:
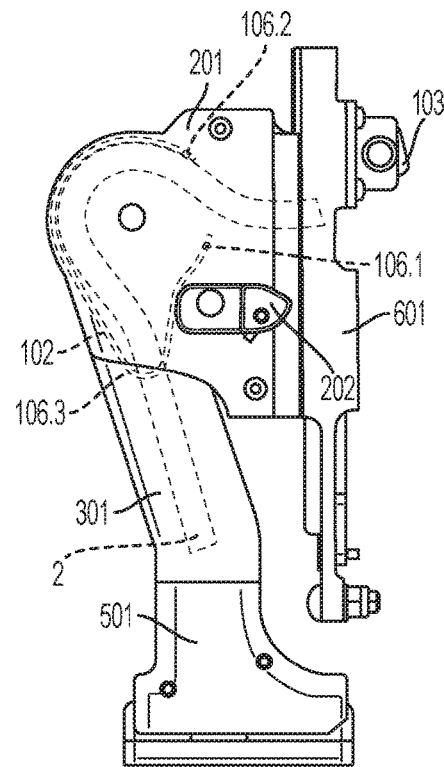
FIG. 2D is a detail side view of the articulating arm assembly of FIG. 1A in the stowed configuration.
Figure 5A:
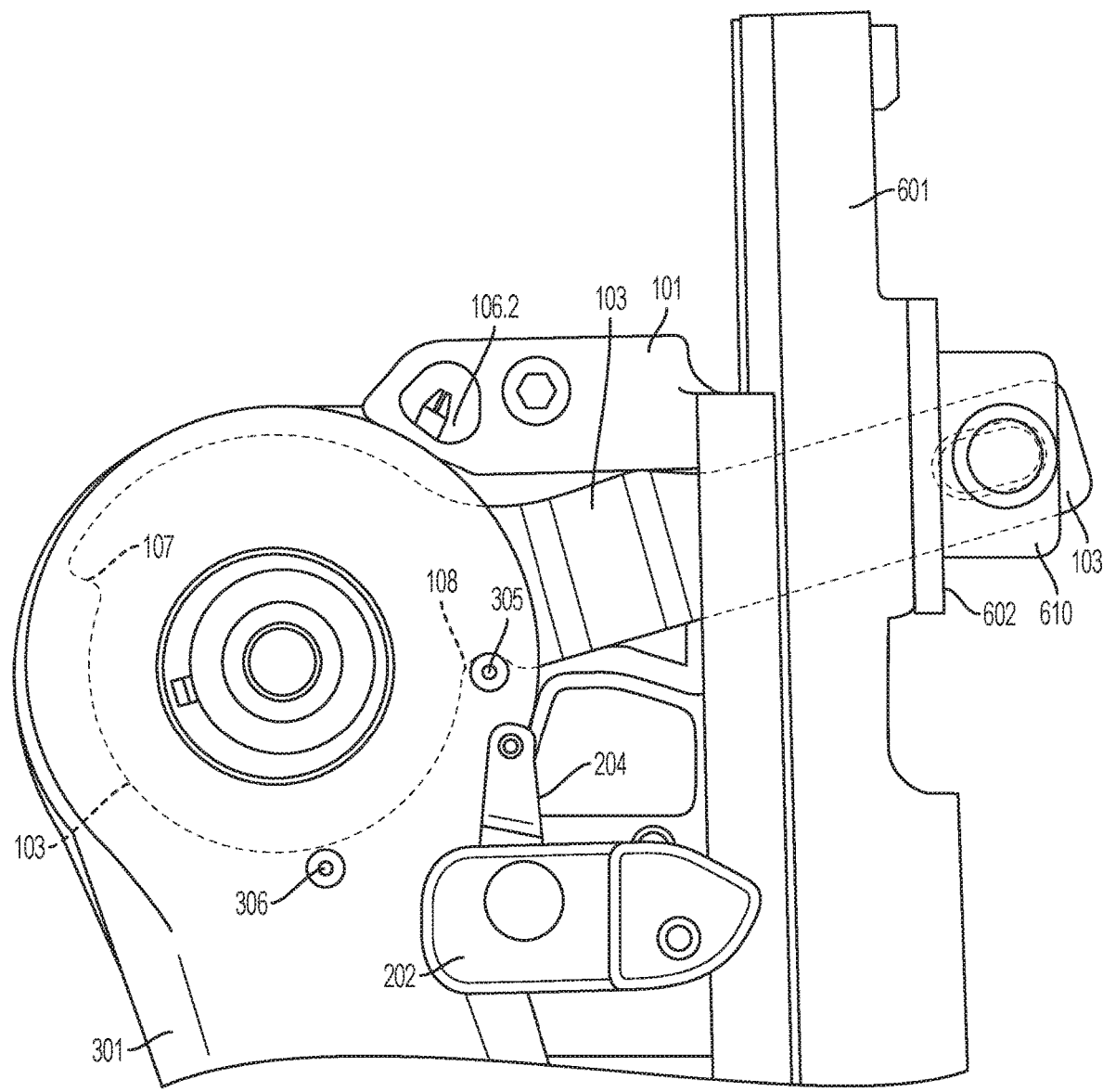
FIG. 5A is a detail side view of the articulating arm assembly of FIG. 1A.

In some embodiments, as shown in FIG. 3, the articulating arm assembly includes a closeout 102 and a link arm 103. The closeout 102 functions to cover an opening of the articulating arm assembly to ensure wiring components are enclosed within the articulating arm assembly for the purpose of meeting safety, regulatory, and/or maintenance requirements. The link arm 103 may include a central hole 105 that is coaxial with hinge axis A. The closeout 102 may include a flexible portion 106. In some embodiments, the closeout 102 is an elongated flat plate or tape-like component. The flexible portion 106 may be capable of moving and/or changing shape based on movement of the roller 404 of the arm cover 401 (see FIGS. 2C and 7A). In some embodiments, the flexible portion 106 may be secured at a lower attachment point 106.1 to the pivot 101 at an approximately central location (see FIGS. 2C and 2D). In addition, the flexible portion 106 may be secured at an upper attachment point 106.2 to the pivot 101 at an upper location (see FIGS. 2C and 2D). The flexible portion 106 may be secured in tension between (1) the lower attachment point 106.1 of the flexible portion 106, (2) a protrusion 106.3 caused by the roller 404 of the arm cover 401, and (3) the upper attachment point 106.2 of the flexible portion 106. As shown in FIG. 5A, the upper attachment point 106.2 may be attached to pivot 101 using a fastener inserted through a portion of the pivot 101. When the articulating arm assembly is in the stowed configuration, as shown in FIGS. 2B and 2D, the roller 404 is disposed closer to the lower attachment point 106.1 of the flexible portion 106 such that the flexible portion 106 is disposed in a first or stowed position that includes a protrusion 106.3 that extends approximately parallel to the direction of the arm. As illustrated in FIG. 2B, the section of the flexible portion 106 closer to the upper attachment point 106.2 acts as a cover to close a gap on the upper side of the articulating arm assembly between the pivot 101 and the arm body 301. In the deployed (viewing) configuration, as shown in FIGS. 2A and 2C, the roller 404 pivots about hinge axis A approximately 135° relative to the stowed position such that the flexible portion 106 is disposed in a second or deployed position that includes a protrusion 106.3 that extends approximately parallel to the direction of the arm when in the deployed configuration (the roller 404 is shown in the deployed configuration in FIG. 2C). As illustrated in FIG. 2A, the section of the flexible portion 106 closer to the lower attachment point 106.1 acts as a cover to close a gap on the lower side of the articulating arm assembly between the pivot 101 and the arm body 301.

The link arm 103, as shown in FIGS. 1A and 3, includes an arm portion extending toward mounting bracket 601 and an annular portion that is concentric with hinge axis A such that the link arm 103 is configured to rotate about hinge axis A. The arm portion of the link arm 103 is located in an upward position when the articulating arm assembly is in the stowed configuration. As shown in FIGS. 1B and 2C, the link arm 103 pivots such that the arm portion of the link arm 103 is disposed in a downward position for the released and deployed positions. An end of the arm portion of the link arm 103 attaches to a link bracket 610 that is attached to a mounting surface 602 of the mounting bracket 601 (see FIGS. 5A, 11B, and 11C). In the stowed position, the pivot 101 is disposed relative to the mounting bracket 601 such that the link arm 103 is angled downward from the link bracket 610 toward the closeout 102 (see FIGS. 1A, 2D, and 5A). In the released and deployed positions, the pivot 101 is disposed relative to the mounting bracket 601 such that the link arm 103 is angled upward from the link bracket 610 toward the closeout 102 (see FIGS. 1B and 2C). In some embodiments, after the latch 202 is released, rotational movement of the link arm 103 toward the released or deployed positions is maintained due to the clutch 30, which may act as a ratchet.

As shown in FIG. 3, at the hinge axis A, the articulating arm assembly may include a bushing 20, a clutch 30, and a sleeve 40. In some embodiments, the bushing 20 is a plastic self-lubricating bushing. In certain embodiments, the clutch 30 is a one-way clutch configured to bias the arm toward the released configuration and away from the stowed configuration (after the latch 202 is released).

Figure 4A:
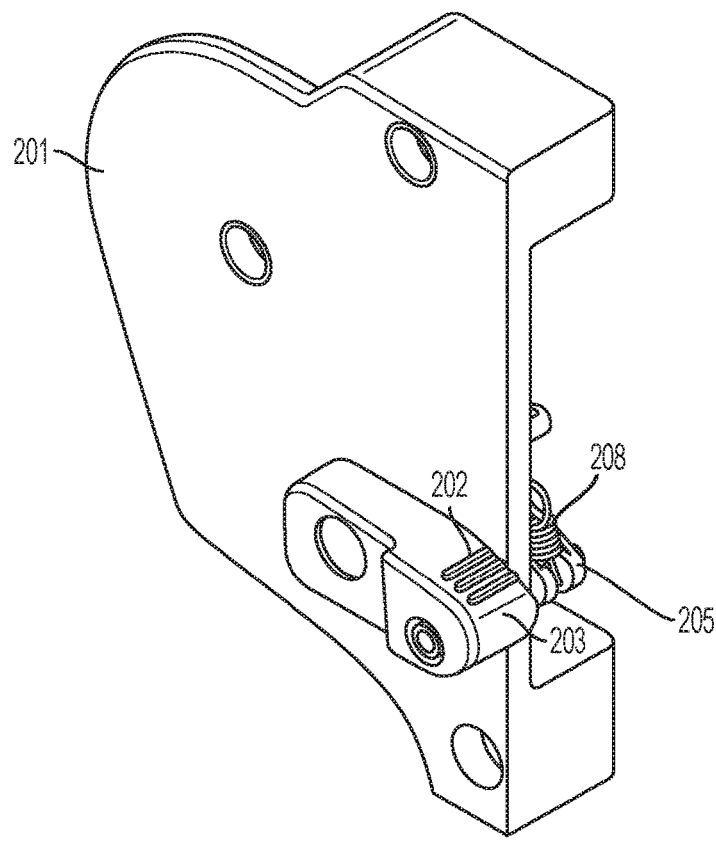
FIGS. 4A and 4B are detail perspective views of the articulating arm assembly of FIG. 1A.
Figure 4B:
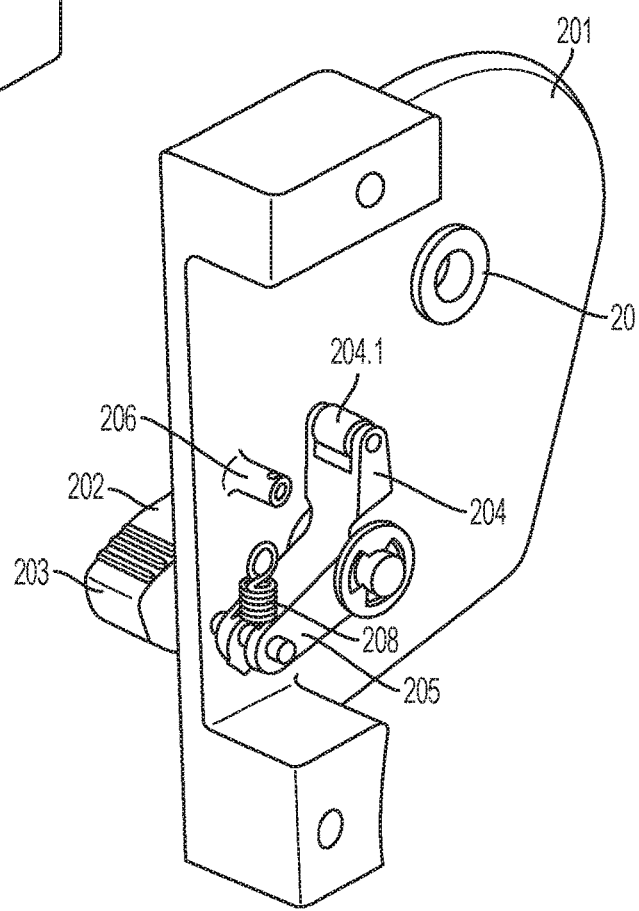
Figure 5B:
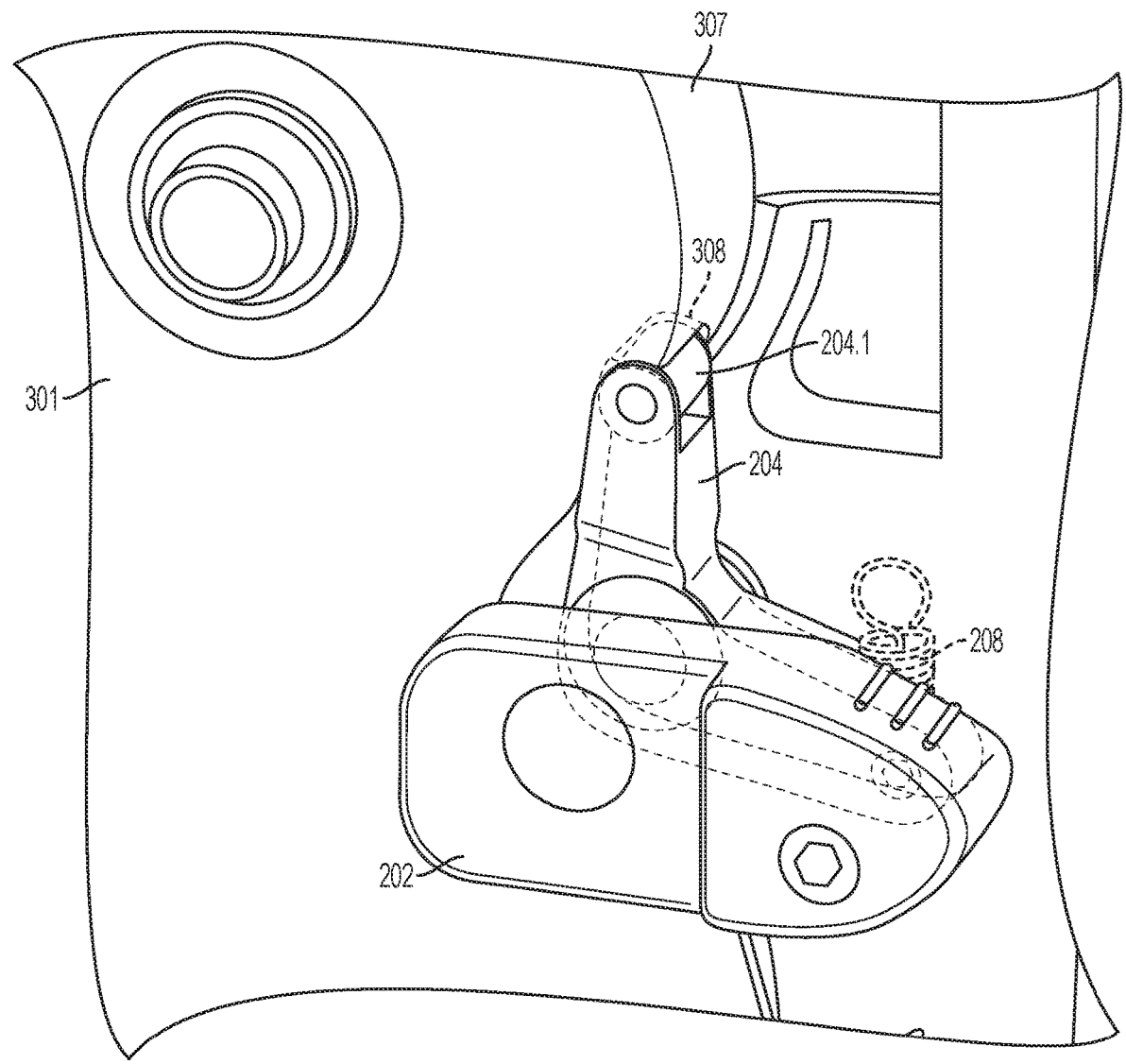
FIG. 5B is a detail perspective view of the articulating arm assembly of FIG. 1A.
Figure 5C:
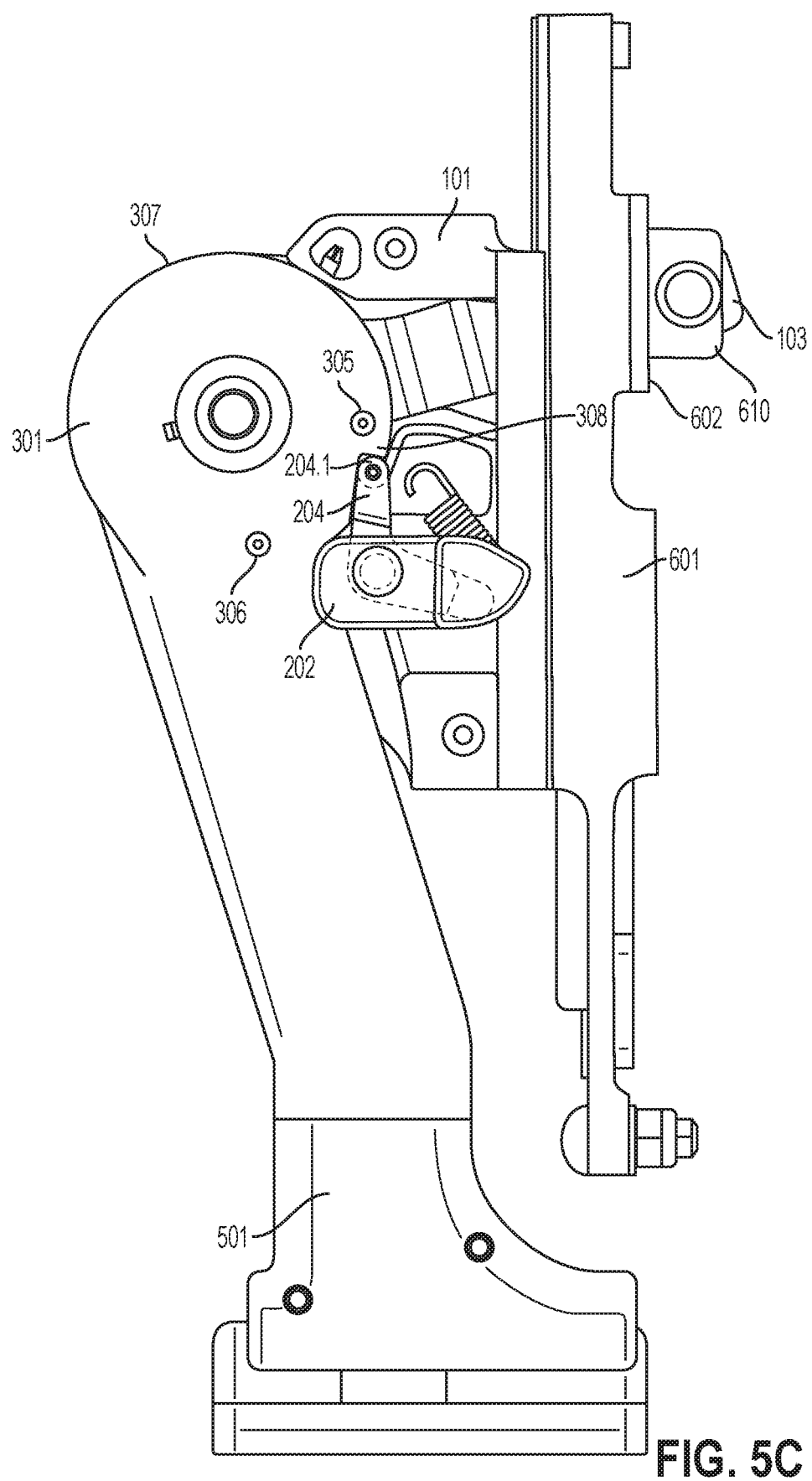
FIG. 5C is a side view of the articulating arm assembly of FIG. 1A.

The pivot cover 201 is shown in FIGS. 4A and 4B and may be configured to attach to the pivot 101 for securing the mechanism at hinge axis A and creating a cavity to accommodate part of the arm body 301. The pivot cover 201 may be arranged such that latch 202 extends through the pivot cover 201. The pivot cover 201 may also include a bushing 20. On the external side of the pivot cover 201, the latch 202 may include a latch release button 203. On the internal side of the pivot cover 201, the latch 202 may include a first arm 204 that includes a roller 204.1 and a second arm 205 attached to a spring 208 where the spring 208 is also connected to a stud 206. In some embodiments, the first and second arms 204 and 205 are a single integral component. Pressing the latch release button 203 stretches the spring 208 and causes the roller 204.1 of the first arm 204 to disengage from notch 308 of arm body 301. FIG. 5B shows the roller 204.1 engaged with notch 308. While the latch release button 203 is pressed, the arm body 301 may rotate clockwise (as shown from the perspective in FIG. 5A) such that the roller 204.1 moves past notch 308 of arm body 301. Releasing the latch release button 203 allows the spring 208 to rotate the first and second arms 204 and 205 such that roller 204.1 contacts and rides on outer cylindrical surface 307 of the arm body 301.

FIGS. 6A and 6B show the arm body 301, which may include a hole 302 at a first end that is coaxial with hinge axis A (see FIGS. 2A and 2B for interaction between arm body 301 and hinge axis A). The link engagement pin 305 interfaces with the link arm 103 at notch 108 when the articulating arm assembly is in the stowed configuration and when releasing from the stowed configuration (see FIG. 5A). When the articulating arm assembly is in the deployed configuration, the deployment stop pin 306 interfaces with notch 107 of the link arm 103. The notch 107 is shown in FIGS. 3 and 5A. As shown in FIGS. 6A and 6B, the interior of the arm body 301 may include a cable attachment component 301.1 for securing and guiding the cable 2. The arm body 301 may also include a hinge 304 disposed at the second end 303 of the arm body 301. The hinge 304 may be configured to allow the second pivot 501 to rotate about hinge axis B (see FIG. 6B). Hinge axis B is approximately perpendicular to hinge axis A. The hinge 304 is configured to limit rotation of the second pivot 501 to an arc of approximately 90°. However, when quick release pin 507 is at least partially removed, the hinge 304 allows the second pivot 501 to rotate through a full 360° arc (see FIGS. 8A and 9C).

Figure 8A:
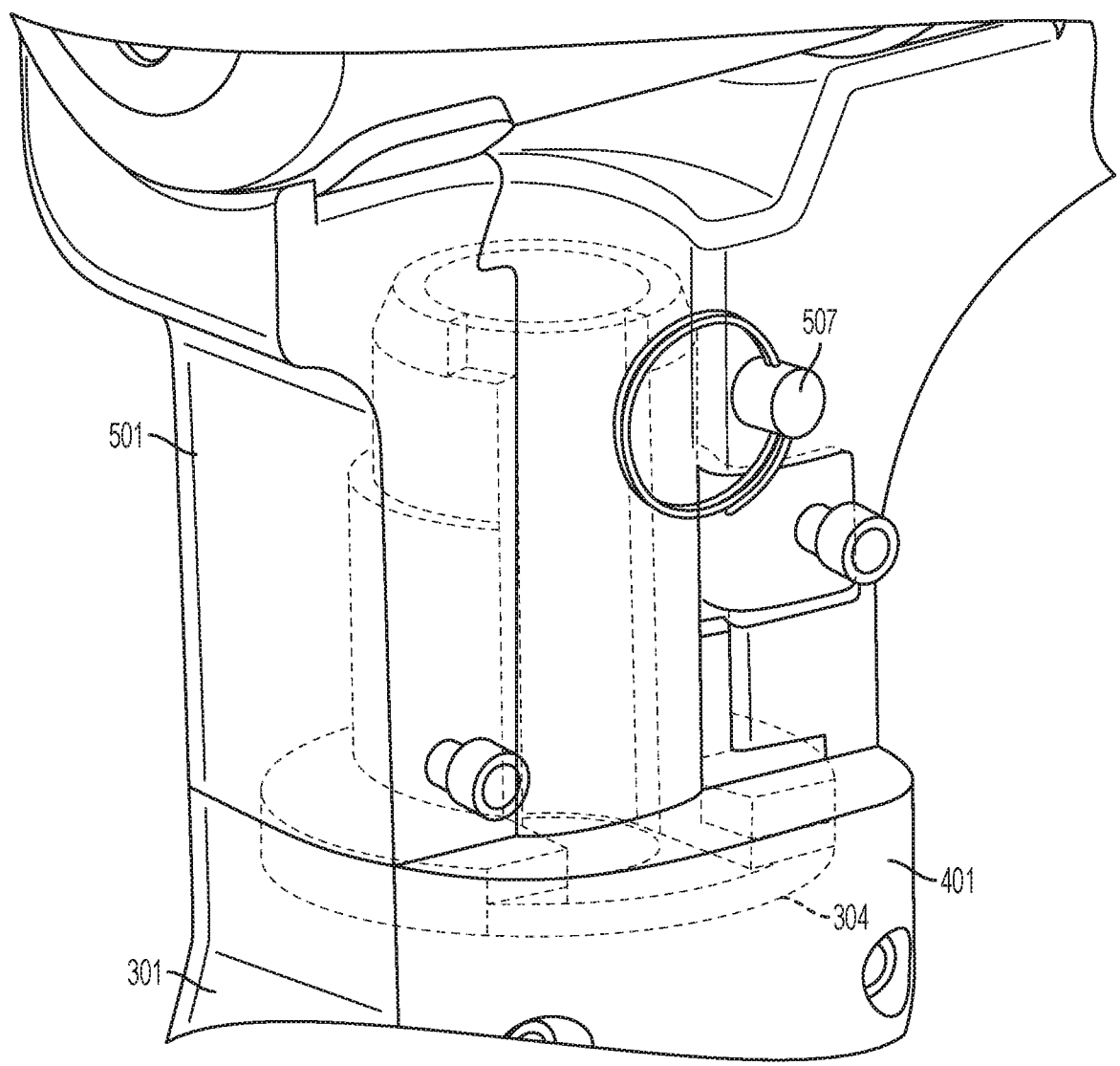

The hinge 304 is shown in FIGS. 8A-8C. The hinge 304 may include a central cylindrical cavity 304.1 that extends in a direction that is approximately parallel to the hinge axis B such that the wiring 2 may pass through the central cylindrical cavity 304.1 and the hinge 304 pivots around the cylindrical cavity 304.1. Thus, hinge 304 may rotate about axis B (i.e., allow the second pivot 501 to rotate about hinge axis B) without interfering with or twisting the wiring 2 (e.g., see FIG. 12B). The hinge 304 may also include a slot 304.2 (see FIG. 8B) configured to interface with the quick release pin 507. When the quick release pin 507 is inserted (as shown in FIGS. 8A and 9C), the pin 507 engages the slot 304.2 such that the hinge 304 may pivot about a limited arc about axis B (i.e., the surface of the hinge 304 at each end of the slot 304.2 bears against the pin at maximum and minimum angles). In some embodiments, this limited arc is approximately 90°, but the arc may be any appropriate arc based on passenger ergonomics. When the quick release pin 507 is removed, the slot 304.2 is no longer constrained (i.e., the surfaces of the hinge 304 at each end of the slot 304.2 do not contact any component when the pin 507 is removed). In some embodiments, the hinge 304 is free to rotate about a full 360° arc when the pin 507 is removed.

As shown in FIG. 8B, in some embodiments, the hinge 304 may be separated into two components including a main portion 304a and a removable secondary portion 304b. To facilitate assembly and maintenance operations, the hinge 304 may be rotated about axis B such that the secondary portion 304b may be removed to allow access to central cylindrical cavity 304.1. For example, when the arm cover 401 is removed (as shown in FIGS. 10A and 10B), and the hinge 304 is rotated about axis B to an appropriate position, the secondary portion 304b may be removed.

The arm cover 401, which has internal and external surfaces, is shown in FIGS. 7A and 7B. As shown in FIG. 7A, the arm cover 401 may include a first end 403 and a second end 402. The arm cover 401 may attach to a first side of the arm body 301 such that the internal surface faces the arm body 301. Near the first end 403 on the internal surface, the arm cover 401 may also include a receptacle with a stop pin 405 that limits the rotation of roller 404. The roller 404 includes an at least partially cylindrical outer surface such that a cylindrical surface contacts the closeout 102. As shown in FIGS. 7A and 7B, the roller 404 may include an angled surface 406 configured to provide clearance for the wiring 2. The second end 402 of the arm cover 401 is configured to interface with the hinge 304 and the second pivot 501.

Figure 9A:
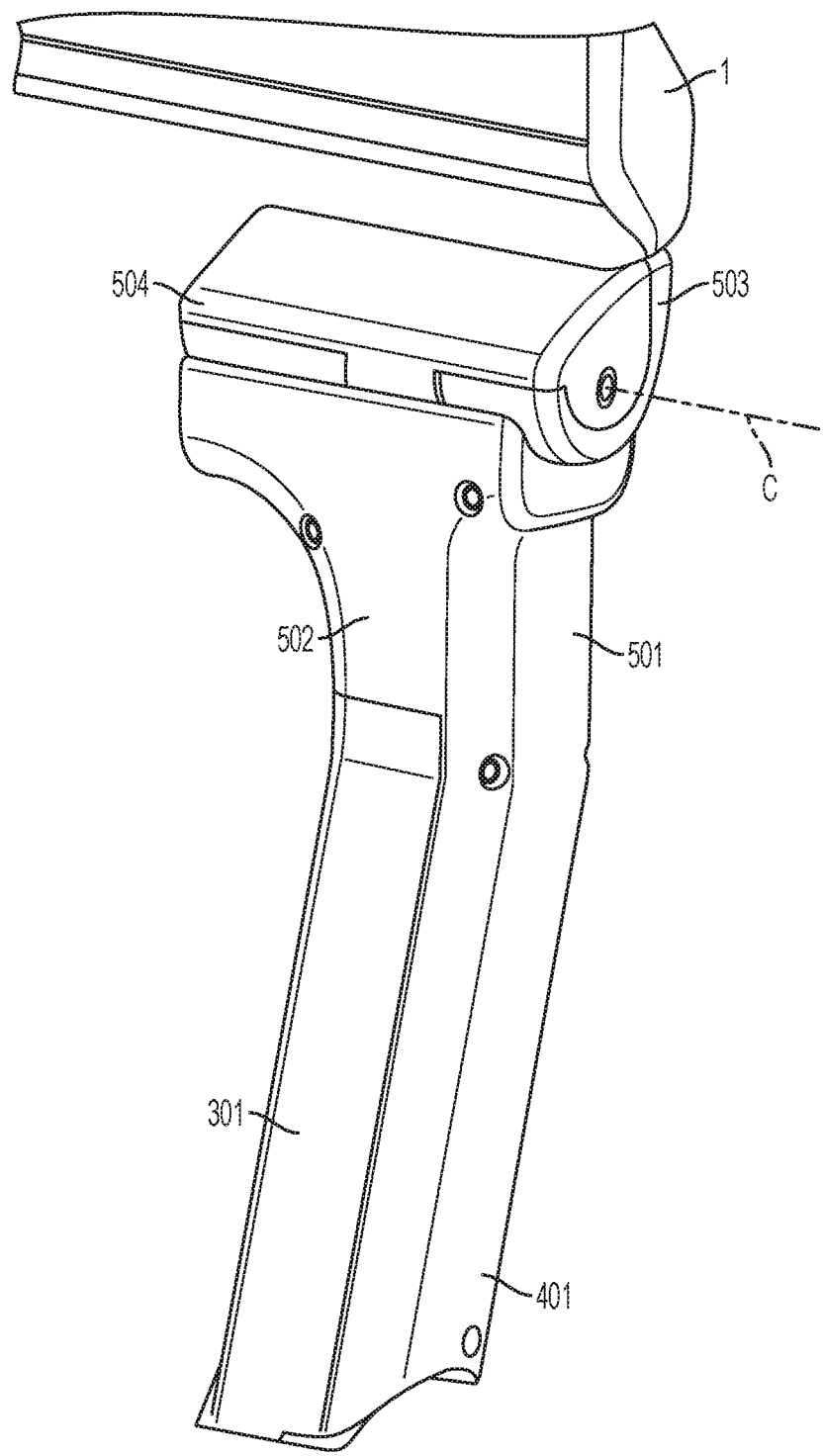
FIGS. 9A, 9B, and 9C are detail perspective views of the articulating arm assembly of FIG. 1A.
Figure 9B:
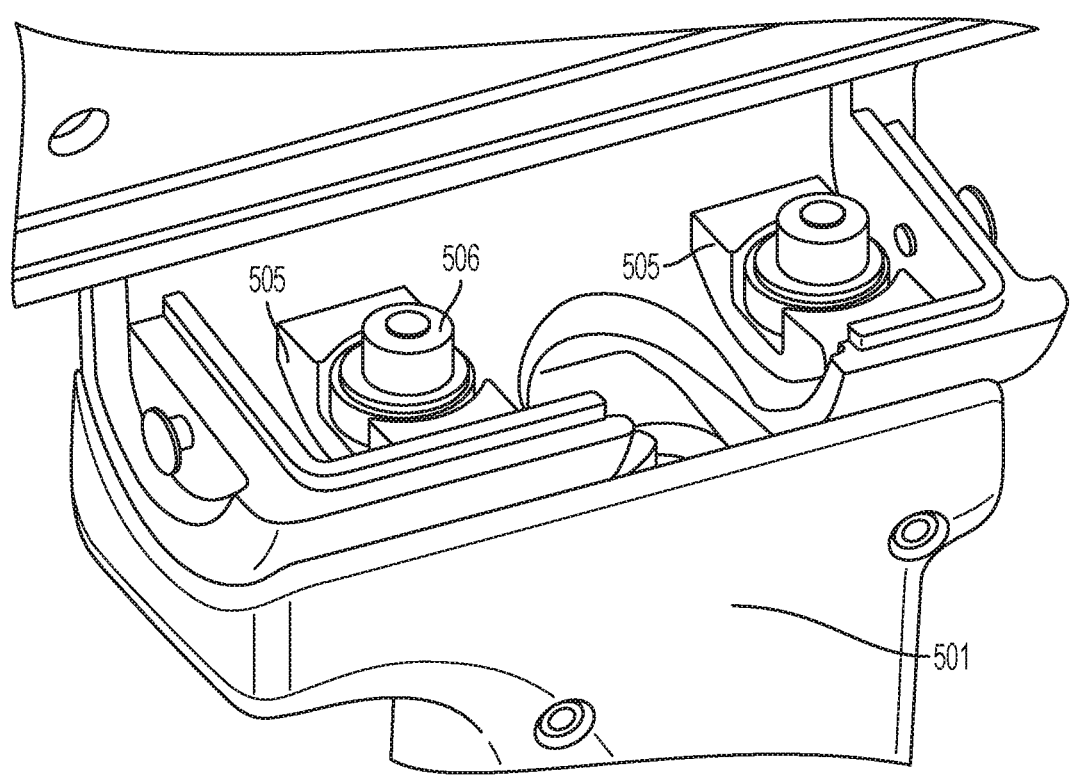
Figure 9C:
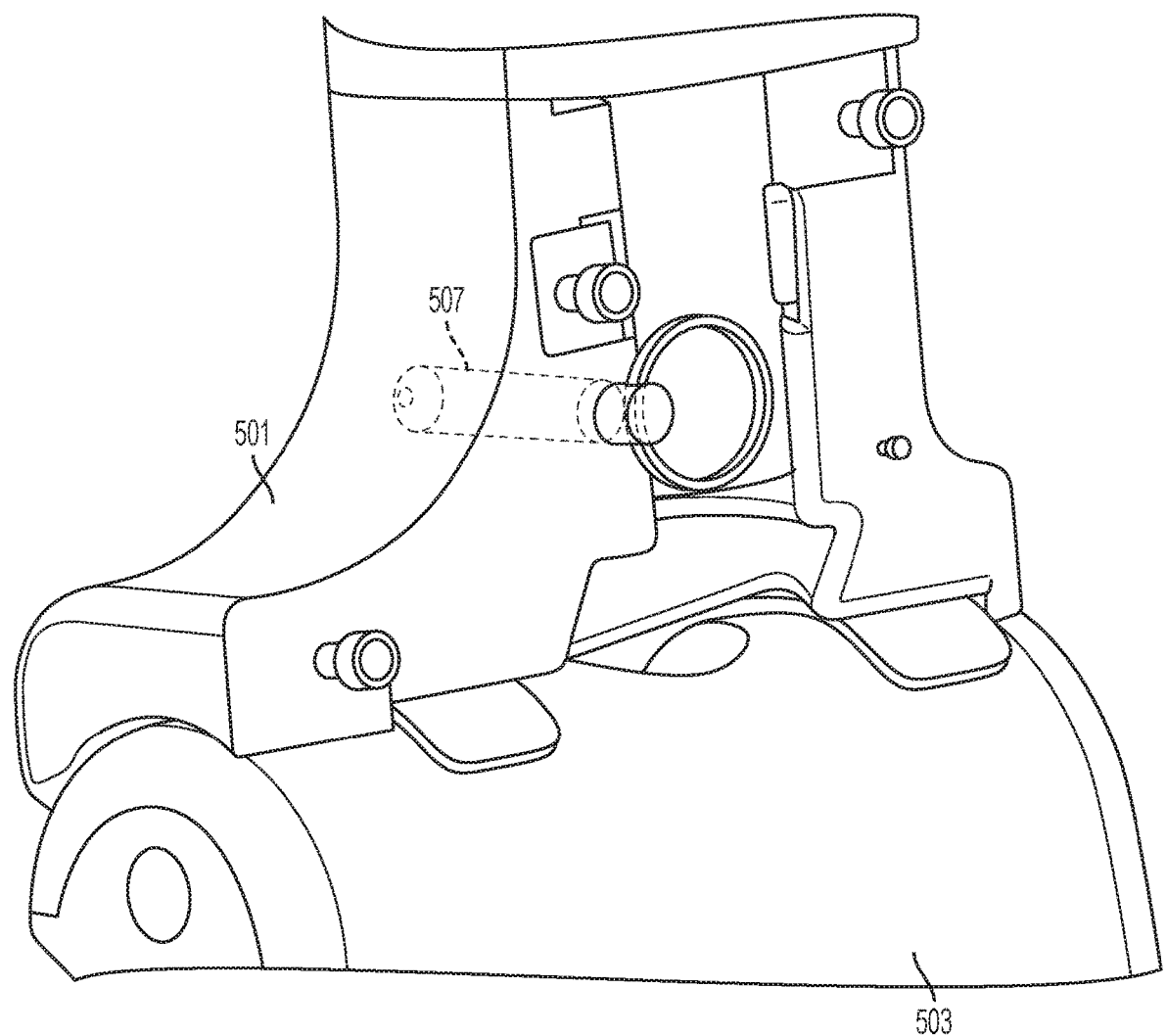

As shown in FIGS. 9A-9C, the second pivot 501 may include a cover 502 and may be attached to an outer hinge 503 configured to allow the electronic device 1 to rotate about hinge axis C. Hinge axis C is approximately perpendicular to hinge axis B, and, in some embodiments, hinge axis C is approximately perpendicular to both hinge axis A and hinge axis B. The outer hinge 503 may include an outer hinge cover 504, at least one friction disk 505, and hardware 506 for the friction disk(s) 505. In some embodiments, each friction disk 505 includes an outer surface that is at least partially cylindrical centered about hinge axis C.

Figure 10A:
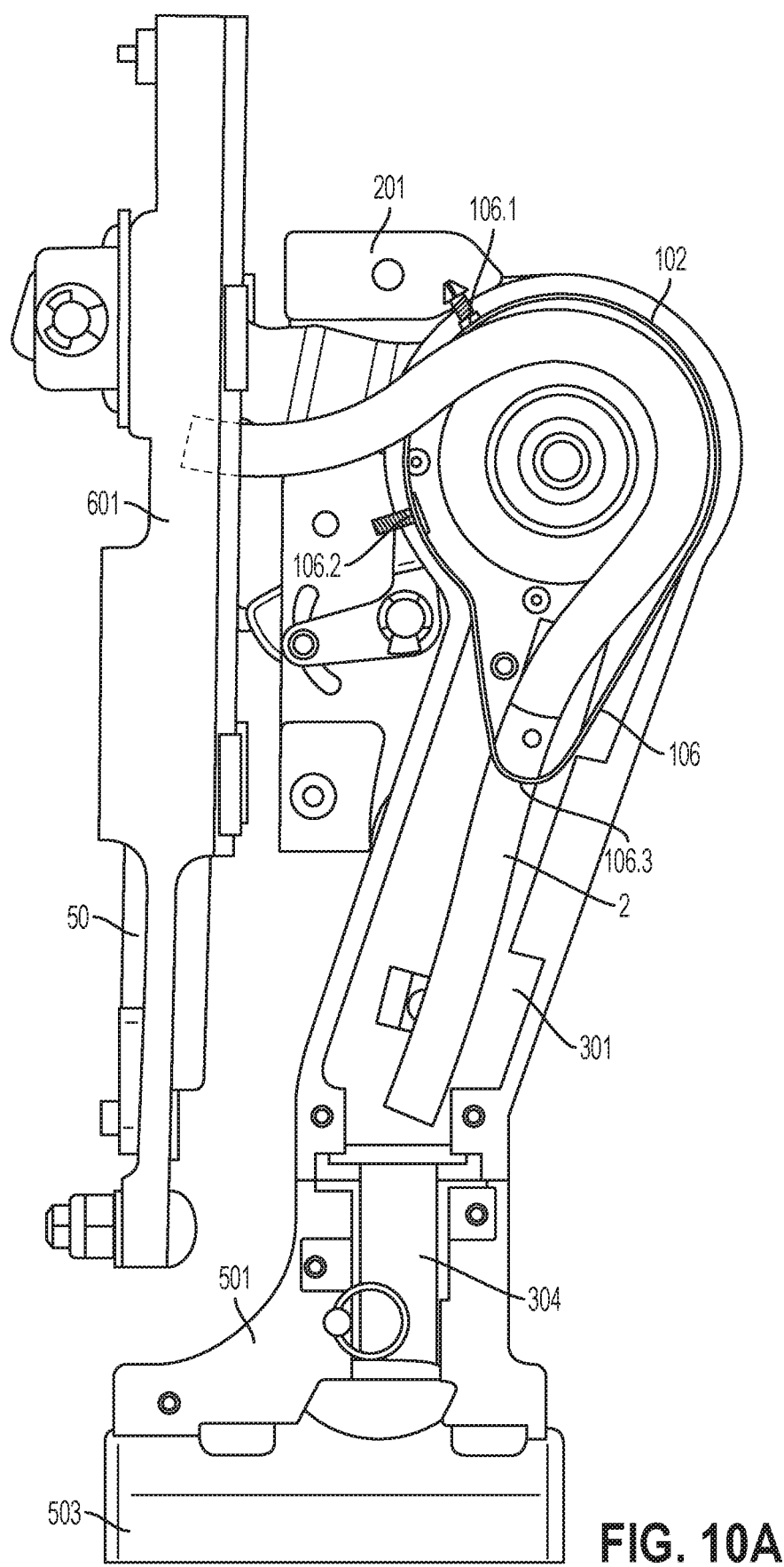
FIG. 10A is a side view of the articulating arm assembly of FIG. 1A.
Figure 10B:
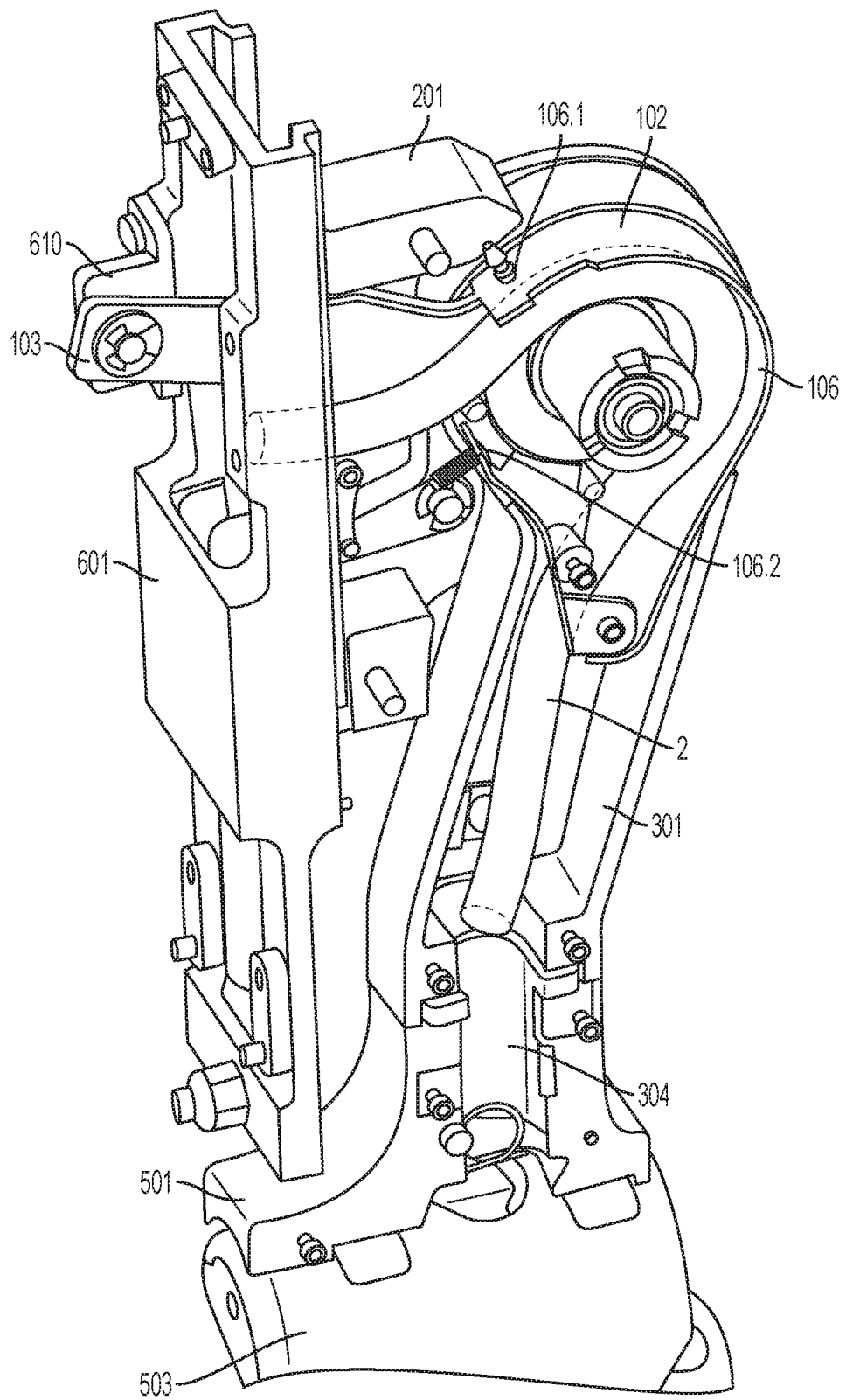
FIG. 10B is a perspective view of the articulating arm assembly of FIG. 1A.

FIGS. 10A and 10B show the articulating arm assembly with the arm cover 401 removed. In this configuration with the arm cover 401 removed and the secondary portion 304b removed or disengaged (as described above), the wiring 2 can be inserted or removed from the articulating arm assembly without removing connectors and/or disassembling the wiring 2 (i.e., for manufacturing, maintenance, and/or repair operations). The wiring 2 follows a path through the arm body 301 and curves at least partially around hole 302 (e.g., see FIGS. 10A and 10B) and is attached to cable attachment component 301.1 (see FIGS. 6A and 6B). In some embodiments, the cable 2 is disposed inside the pivot 101 between an internal surface of the pivot 101 and the roller 404.

Figure 11A:
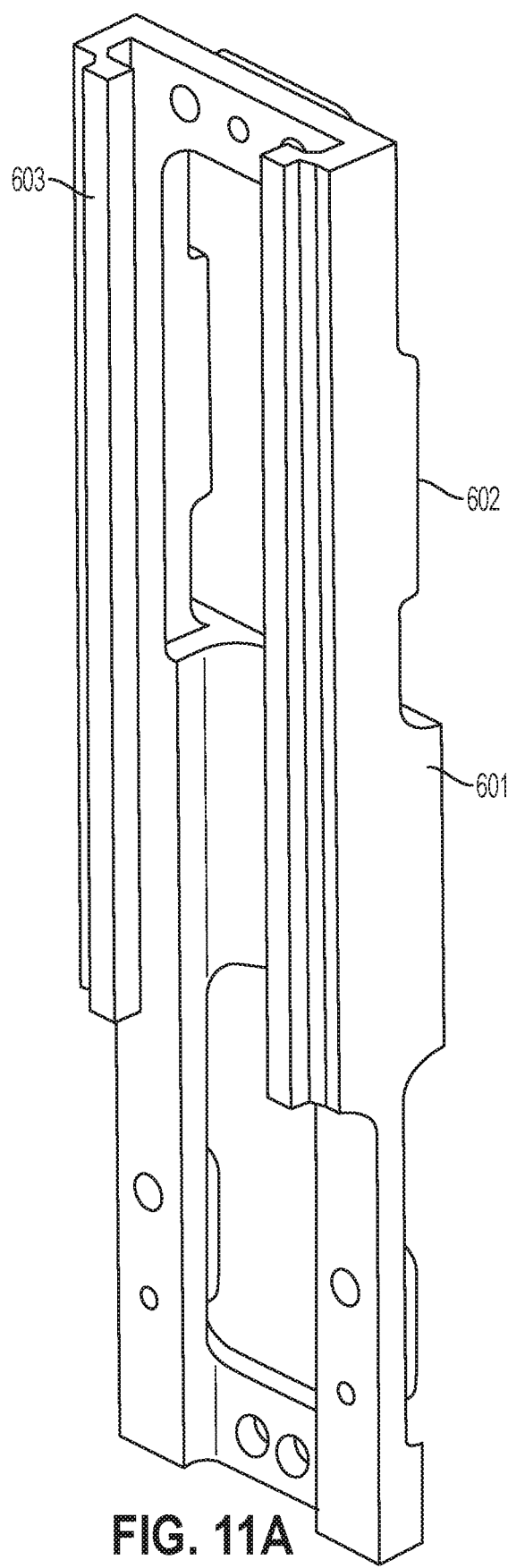
FIGS. 11A, 11B, and 11C are detail perspective views of the articulating arm assembly of FIG. 1A.
Figure 11B:
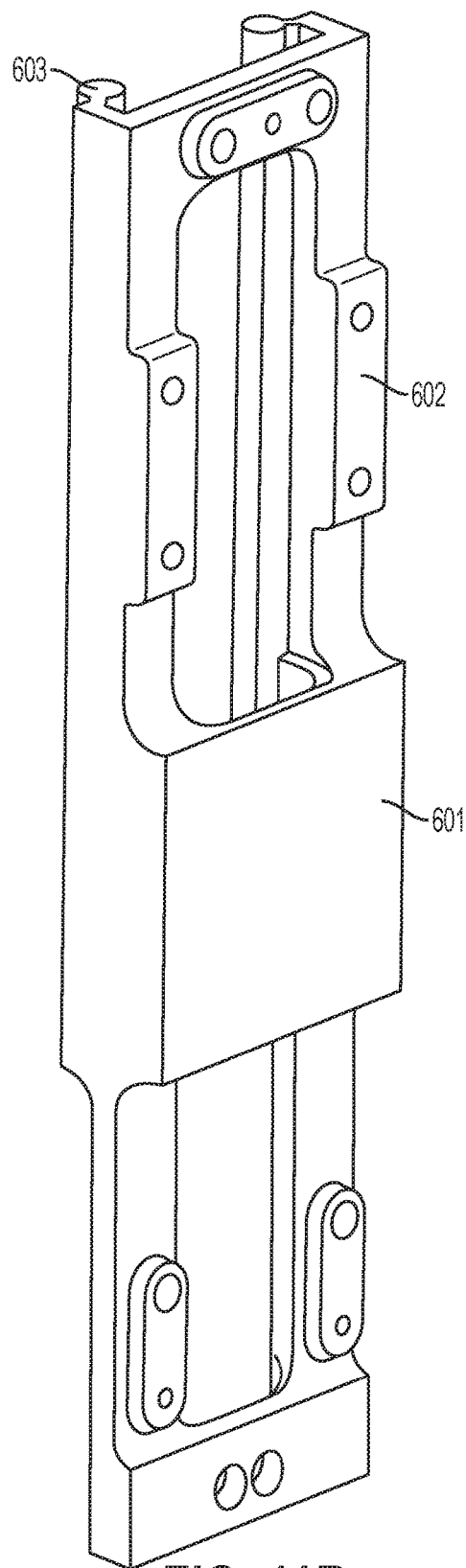
Figure 11C:
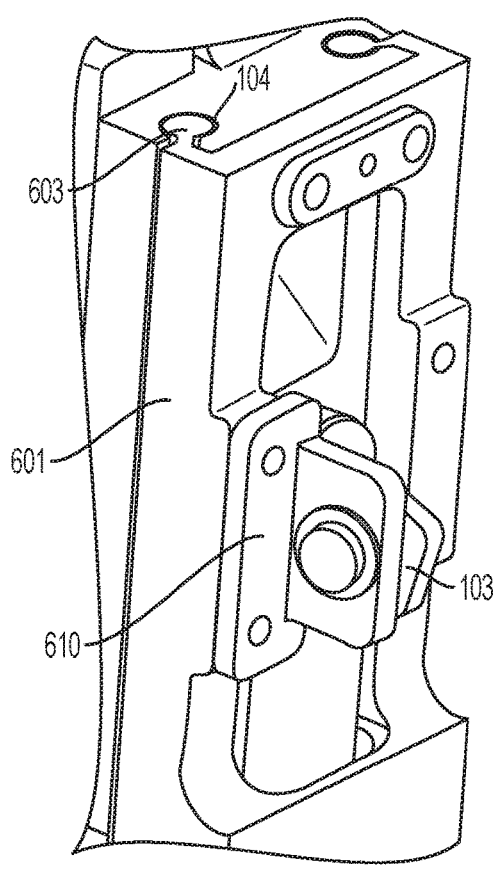

The mounting bracket 601 is shown in FIGS. 11A-11C. In some embodiments, the mounting bracket 601 attaches to a passenger seat such that protrusions 603 are exposed for attachment to pivot 101. The mounting bracket 601 may be stationary or fixedly attached to the passenger seat such that the pivot 101 is configured to along the length of protrusions 603. The mounting bracket 601 also includes at least one mounting surface 602 for securing the link bracket 610. In some embodiments, the link bracket 610 is symmetric such that each side includes a mounting surface 602, which allows the mounting bracket 601 to function for a left-handed or right-handed seat.

Figure 12A:
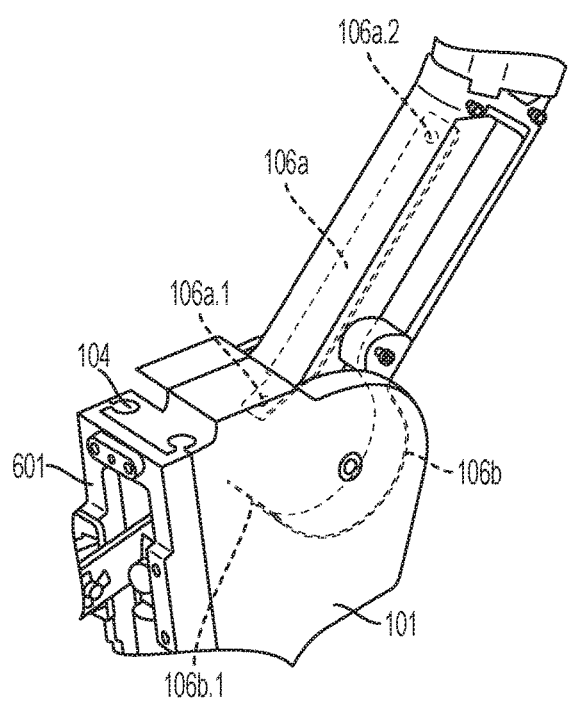
FIGS. 12A and 12B are detail perspective views of the articulating arm assembly of FIG. 1A.
Figure 12B:
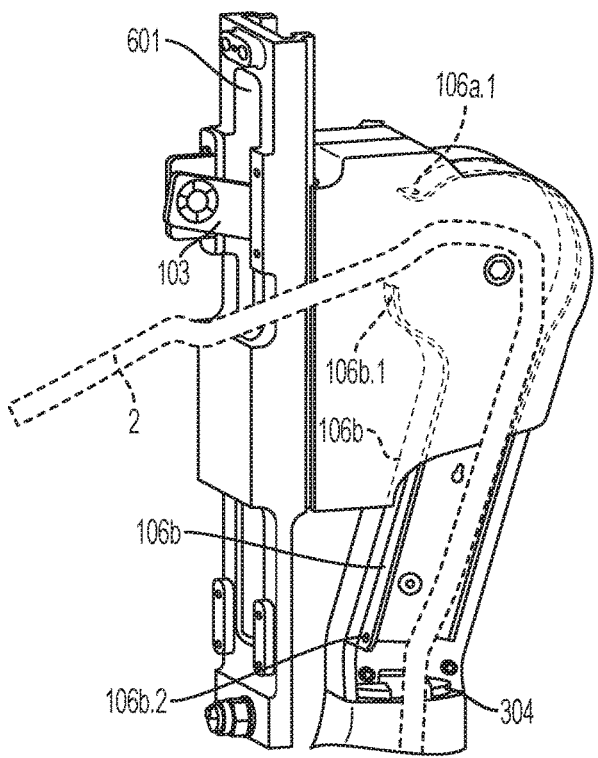

As shown in FIGS. 12A and 12B, in some embodiments, the flexible portion 106 of the closeout 102 may be two separate components. For example, the articulating arm assembly may include an upper flexible portion 106a and a lower flexible portion 106b. As shown in FIG. 12A, in the deployed configuration, the upper flexible portion 106a is primarily located within the assembly (not exposed) and includes a proximate attachment point 106a.1 attached to pivot 101. At the distal attachment point 106a.2, the upper flexible portion 106a is attached to the arm body 301. In the stowed configuration (FIG. 12B), the upper flexible portion 106a acts as a cover to close a gap on the upper side of the articulating arm assembly between the pivot 101 and the arm body 301 (similar to FIG. 2B). As shown in FIG. 12B, in the stowed configuration, the lower flexible portion 106b is primarily located within the assembly (not exposed) and includes a proximate attachment point 106b.1 attached to pivot 101. At the distal attachment point 106b.2, the lower flexible portion 106b is attached to the arm body 301. In the deployed configuration (FIG. 12A), the lower flexible portion 106b acts as a cover to close a gap on the lower side of the articulating arm assembly between the pivot 101 and the arm body 301 (similar to FIG. 2A).

The components of the articulating arm assembly may be formed of materials including, but not limited to, machined aluminum, aluminum sheet metal, carbon composite, plastic, thermoplastic, steel, other aluminum material, stainless steel, other plastic or polymer materials, other metallic materials, other composite materials, or other similar materials. Moreover, the components of the seat may be attached to one another via suitable fasteners, which include, but are not limited to, screws, bolts, rivets or other mechanical or chemical fasteners.

In the following, further examples are described to facilitate understanding of aspects of the invention:

Example A. An articulating arm assembly for a passenger seat comprising:
  an arm body rotatably attached to a pivot, the arm body configured to move between a stowed position and a deployed position; and
  a closeout comprising:
    a flexible portion;
    a first end attached to a first attachment point internal to the pivot; and
    a second end attached to a second attachment point internal to the pivot,
  wherein the flexible portion is configured to change shape depending on a location of the arm body.

Example B. The articulating arm assembly of Example A or any of the preceding or subsequent examples, wherein the flexible portion comprises a protrusion disposed between the first end and the second end wherein the protrusion moves based on a position of the arm body.

Example C. The articulating arm assembly of Example B or any of the preceding or subsequent examples, wherein:
  when the arm body is in the stowed position, the protrusion is disposed closer to the first end of the closeout; and
  when the arm body is in the deployed position, the protrusion is disposed closer to the second end of the closeout.

Example D. The articulating arm assembly of Example B or any of the preceding or subsequent examples, further comprising an arm cover that attaches to a first side of the arm body, the arm cover comprising a first end, a second end, and a receptacle disposed near the first end for attaching to a roller.

Example E. The articulating arm assembly of Example D or any of the preceding or subsequent examples, wherein the flexible portion is stretched around the roller such that the protrusion corresponds to the position of the roller.

Example F. The articulating arm assembly of Example D or any of the preceding or subsequent examples, wherein the roller comprises an at least partially cylindrical outer surface and an angled surface.

Example G. The articulating arm assembly of Example A or any of the preceding or subsequent examples, wherein the pivot moves in a linear direction relative to a mounting bracket when the arm body moves between the stowed position and the deployed position.

Example H. The articulating arm assembly of Example A or any of the preceding or subsequent examples, further comprising a hinge disposed at a distal end of the arm body, the hinge configured to rotate about a hinge axis perpendicular to a rotation axis of the arm body.

Example I. The articulating arm assembly of Example H or any of the preceding or subsequent examples, wherein the hinge comprises a central cylindrical cavity extending in a direction approximately parallel to the hinge axis, the central cylindrical cavity configured to receive wiring passing through the arm body.

Example J. The articulating arm assembly of Example H or any of the preceding or subsequent examples, wherein the hinge comprises a main portion and a removable secondary portion.

Example K. The articulating arm assembly of Example H or any of the preceding or subsequent examples, further comprising a removable pin, wherein the hinge is limited to a rotation in an arc of approximately 90° when the removable pin is inserted and the hinge is freely rotatable when the removable pin is removed.

Example L. A passenger seat comprising:
an articulating arm assembly comprising:
an arm body rotatably attached to a pivot, the arm body configured to move between a stowed position and a deployed position; and
a closeout that comprises at least one flexible portion and at least one attachment to an internal portion of the pivot,
wherein the at least one flexible portion is configured to change shape depending on a location of the arm body.

Example M. The passenger seat of Example L or any of the preceding or subsequent examples, wherein the at least one flexible portion comprises a protrusion disposed between the first end and the second end wherein the protrusion moves based on a position of the arm body.

Example N. The passenger seat of Example M or any of the preceding or subsequent examples, wherein:
when the arm body is in the stowed position, the protrusion is disposed closer to the first end of the closeout; and
when the arm body is in the deployed position, the protrusion is disposed closer to the second end of the closeout.

Example O. The passenger seat of Example M or any of the preceding or subsequent examples, further comprising an arm cover that attaches to a first side of the arm body, the arm cover comprising a first end, a second end, and a receptacle disposed near the first end for attaching to a roller.

Example P. The passenger seat of Example 0 or any of the preceding or subsequent examples, wherein the at least one flexible portion is stretched around the roller such that the protrusion corresponds to the position of the roller.

Example Q. The passenger seat of Example 0 or any of the preceding or subsequent examples, wherein the roller comprises an at least partially cylindrical outer surface and an angled surface.

Example R. The passenger seat of Example L or any of the preceding or subsequent examples, wherein the pivot moves in a linear direction relative to a mounting bracket when the arm body moves between the stowed position and the deployed position.

Example S. The passenger seat of Example L or any of the preceding or subsequent examples, further comprising a hinge disposed at a second end of the arm body, the hinge configured to rotate about a hinge axis perpendicular to a rotation axis of the arm body.

Example T. The passenger seat of Example S or any of the preceding or subsequent examples, wherein the hinge comprises a central cylindrical cavity extending in a direction approximately parallel to the hinge axis, the central cylindrical cavity configured to receive wiring passing through the arm body.

Example U. The passenger seat of Example S or any of the preceding or subsequent examples, wherein the hinge comprises a main portion and a removable secondary portion.

Example V. The passenger seat of Example S or any of the preceding or subsequent examples, further comprising a removable pin, wherein the hinge is limited to a rotation in an arc of approximately 90° when the removable pin is inserted and the hinge is freely rotatable when the removable pin is removed.

Example W. The passenger seat of Example L or any of the preceding or subsequent examples, wherein the at least one flexible portion comprises two separate flexible portions.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An articulating arm assembly for a passenger seat comprising:
    an arm body rotatably attached to a pivot, the arm body configured to move between a stowed position and a deployed position; and
    a closeout comprising:
        a flexible portion;
        a first end attached to a first attachment point internal to the pivot; and
        a second end attached to a second attachment point internal to the pivot, wherein:
    the flexible portion is configured to change shape depending on a location of the arm body; and
    the flexible portion comprises a protrusion disposed between the first end and the second end wherein the protrusion moves based on a position of the arm body.

2. The articulating arm assembly of claim 1, wherein:
    when the arm body is in the stowed position, the protrusion is disposed closer to the first end of the closeout; and
    when the arm body is in the deployed position, the protrusion is disposed closer to the second end of the closeout.

3. The articulating arm assembly of claim 1, further comprising an arm cover that attaches to a first side of the arm body, the arm cover comprising a first end, a second end, and a receptacle disposed near the first end for attaching to a roller.

4. The articulating arm assembly of claim 3, wherein the flexible portion is stretched around the roller such that the protrusion corresponds to the position of the roller.

5. The articulating arm assembly of claim 3, wherein the roller comprises an at least partially cylindrical outer surface and an angled surface.

6. The articulating arm assembly of claim 1, wherein the pivot moves in a linear direction relative to a mounting bracket when the arm body moves between the stowed position and the deployed position.

7. The articulating arm assembly of claim 1, further comprising a hinge disposed at a distal end of the arm body, the hinge configured to rotate about a hinge axis perpendicular to a rotation axis of the arm body.

8. The articulating arm assembly of claim 7, wherein the hinge comprises a central cylindrical cavity extending in a direction approximately parallel to the hinge axis, the central cylindrical cavity configured to receive wiring passing through the arm body.

9. The articulating arm assembly of claim 7, wherein the hinge comprises a main portion and a removable secondary portion.

10. The articulating arm assembly of claim 7, further comprising a removable pin, wherein the hinge is limited to a rotation in an arc of approximately 90° when the removable pin is inserted and the hinge is freely rotatable when the removable pin is removed.

11. A passenger seat comprising:
an articulating arm assembly comprising:
an arm body rotatably attached to a pivot, the arm body configured to move between a stowed position and a deployed position; and
a closeout that comprises at least one flexible portion and at least one attachment to an internal portion of the pivot, wherein:
the at least one flexible portion is configured to change shape depending on a location of the arm body; and
the pivot moves in a linear direction relative to a mounting bracket when the arm body moves between the stowed position and the deployed position.

12. The passenger seat of claim 11, wherein the at least one flexible portion comprises a protrusion disposed between a first end and a second end of the closeout, wherein the protrusion moves based on a position of the arm body.

13. The passenger seat of claim 12, wherein:
when the arm body is in the stowed position, the protrusion is disposed closer to the first end of the closeout; and
when the arm body is in the deployed position, the protrusion is disposed closer to the second end of the closeout.

14. The passenger seat of claim 12, further comprising an arm cover that attaches to a first side of the arm body, the arm cover comprising a first end, a second end, and a receptacle disposed near the first end for attaching to a roller.

15. The passenger seat of claim 14, wherein the at least one flexible portion is stretched around the roller such that the protrusion corresponds to the position of the roller.

16. The passenger seat of claim 14, wherein the roller comprises an at least partially cylindrical outer surface and an angled surface.

17. The passenger seat of claim 11, further comprising a hinge disposed at a second end of the arm body, the hinge configured to rotate about a hinge axis perpendicular to a rotation axis of the arm body.

18. The passenger seat of claim 17, wherein the hinge comprises a central cylindrical cavity extending in a direction approximately parallel to the hinge axis, the central cylindrical cavity configured to receive wiring passing through the arm body.

19. The passenger seat of claim 17, wherein the hinge comprises a main portion and a removable secondary portion.

20. The passenger seat of claim 17, further comprising a removable pin, wherein the hinge is limited to a rotation in an arc of approximately 90° when the removable pin is inserted and the hinge is freely rotatable when the removable pin is removed.

21. The passenger seat of claim 11, wherein the at least one flexible portion comprises two separate flexible portions.

* * * * *